US 8,726,082 B2

(12) United States Patent
Moore et al.

(10) Patent No.: US 8,726,082 B2
(45) Date of Patent: May 13, 2014

(54) METHOD AND SYSTEM FOR PROVIDING INCOMPLETE ACTION MONITORING AND SERVICE FOR DATA TRANSACTIONS

(75) Inventors: Devin C. Moore, Lewis Center, OH (US); Wade P. Thompson, Moore, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 278 days.

(21) Appl. No.: 13/225,142

(22) Filed: Sep. 2, 2011

(65) Prior Publication Data
US 2013/0061091 A1  Mar. 7, 2013

(51) Int. Cl.
*G06F 11/00* (2006.01)
(52) U.S. Cl.
USPC ................................. 714/18; 714/4.1; 714/43

(58) Field of Classification Search
USPC ................................. 714/4.1, 18, 43
See application file for complete search history.

(56) References Cited

U.S. PATENT DOCUMENTS

| 5,335,343 | A  | * | 8/1994  | Lampson et al. | 714/19  |
| 7,478,266 | B2 | * | 1/2009  | Gatto et al.   | 714/6.1 |
| 7,979,740 | B2 | * | 7/2011  | Taylor et al.  | 714/15  |
| 2005/0283658 | A1 | * | 12/2005 | Clark et al.   | 714/11  |
| 2010/0299556 | A1 | * | 11/2010 | Taylor et al.  | 714/6   |

* cited by examiner

Primary Examiner — Charles Ehne

(57) ABSTRACT

An approach for providing incomplete action monitoring and service for data transactions is described. Incompleteness of a transaction event associated with an application is monitored. The incompleteness of the transaction event is detected in response to a failure in a communication session that transports data of the application. State information relating to transmission of the data for the application is stored. The restoration of the communication session is determined. Completion of the transaction event is initiated based on the stored state information.

20 Claims, 9 Drawing Sheets

METHOD AND SYSTEM FOR PROVIDING INCOMPLETE ACTION MONITORING AND SERVICE FOR DATA TRANSACTIONS

BACKGROUND INFORMATION

Service providers are continually challenged to deliver value and convenience to consumers by providing compelling network services and advancing the underlying technologies. One area of interest has been the development of services and technologies relating to data transactions involved in the execution of applications. For example, in recent years, data transfer speeds have drastically increased, enabling users to send and receive data faster than ever before. In addition, modern technologies have allowed for improved communication session stability, mitigating downtime, interruptions, and other communication session failures. Nonetheless, communication session failures still occur and, thus, can cause halting of operations of various applications. Users, for instance, are typically required to reconnect and restart the data transfer of the entire data file after a communication session failure during a previous attempt to download the data file. Where the data file is of a substantial size, or where data access is restricted to a particular time frame or a number of accesses, such failures can be a considerable burden for users. Such disruptions are, at best, an inconvenience, but can entail loss in time and money.

Therefore, there is a need for an effective approach for minimizing the impact of incomplete data transactions.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing incomplete action monitoring and service for data transactions are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
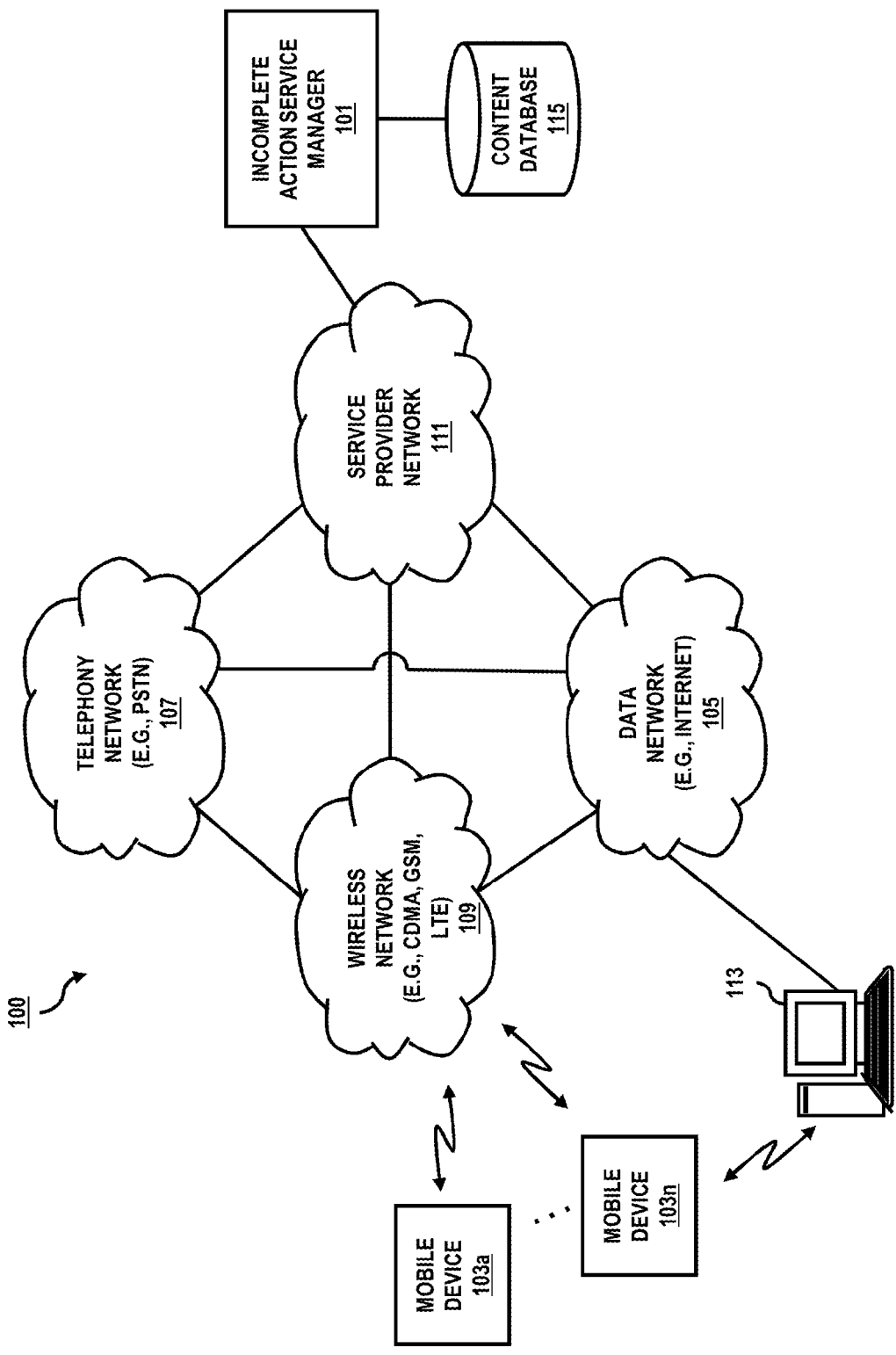
FIG. 1 is a diagram of a system capable of providing incomplete action monitoring and service for data transactions, according to an exemplary embodiment.

FIG. 1 is a diagram of a system capable of providing incomplete action monitoring and service for data transactions, according to an exemplary embodiment. For the purpose of illustration, the system 100 employs an incomplete action service manager 101 that is configured to provide incomplete action monitoring and service for data transactions to one or more user devices (e.g., mobile devices 103) over one or more networks (e.g., data network 105, telephony network 107, wireless network 109, etc.). According to one embodiment, services including data transaction monitoring and completion may be part of managed services supplied by a service provider (e.g., a wireless communication company) as a hosted or subscription-based service made available to users of the mobile devices 103 (or other devices) through a service provider network 111. As shown, the incomplete action service manager 101 may be a part of or connected to the service provider network 111. According to another embodiment, the incomplete action service manager 101 may be include within or connected to a computer device 113, the mobile devices 103, etc. While specific reference will be made thereto, it is contemplated that the system 100 may embody many forms and include multiple and/or alternative components and facilities.

In certain embodiments, the incomplete action service manager 101 may include or have access to a content database 115. Content (e.g., media content) may, for instance, be provided by a service provider, a content provider, etc., over the networks 105-111. The content may be stored in the content database 115, or as a link/reference that identifies a memory or storage location associated with the content. In other embodiments, the content database 115 may be utilized for caching data associated with the content as well as for storing state information relating to respective transaction events.

As discussed, recent technological advances relating to data transmission, such as increased data transfer speeds and communication session stability, enable users to send and receive data faster than ever before while experiencing less downtime, interruptions, and other communication session failures. By way of example, fiber-optic communications permits data transmissions over longer distances, at higher bandwidths, and with less signal interference than many other forms of communication. Fiber-optic communications, for instance, utilize flexible glass fibers to transmit light as data signals, avoiding electromagnetic interference which generally cause issues for technologies utilizing metal wires. However, as mentioned, communication session failures may still occur (e.g., due to weather conditions, power outage, user error, etc.), and these incidents can result in significant losses—e.g., monetarily, if the transaction is financial in nature. In the event of such failures during a data transmission, the application generally must reconnect and restart the entire data transmission process (e.g., reinitiate download of the entire data file or stream).

These disruptions can negatively impact various types of users (consumers). Researchers, for instance, often upload or download large data files that may take hours (or sometimes days) to complete. Restarting the entire process over, in these circumstances, can be quite cumbersome. Additionally, consumers who record television programs, via a digital video recorder (DVR), may experience an interruption in their service, preventing the recording of certain portions of a desired program (e.g., missing the middle or the end of a live sports game). In these cases, the consumer may not even be given the option to restart the recording.

To address this issue, the system 100 of FIG. 1 introduces the capability to monitor for and resolve incomplete data transactions. By way of example, the incomplete action service manager 101 may monitor for an incompleteness of a transaction event associated with an application. A transaction event may, for instance, be deemed incomplete where the data (e.g., data file or stream) has not been transferred appropriately or in its entirety. If a failure occurs in a communication session that transports data of the application (and the transaction event is incomplete), the incompleteness of the transaction event may be detected by the incomplete action service manager 101. To complete the transaction event, state information relating to transmission of the data for the application may be stored for future use (e.g., when the communication session is restored). The state information may, for instance, include information relating to a portion (or portions) of the data that has not been transmitted to a device of a user associated with the transaction event. When it is determined that the communication session has been restored, the incomplete action service manager 101 may then initiate completion of the transaction event based on the stored state information. In addition, the incomplete action service manager 101 may work with a user device (e.g., a mobile device 103, computer device 103, etc.) to enable detection of the incompleteness of the transaction event in response to the communication session failure on the end-user side. In response to the detection, the user device may initiate restoration of the communication session to complete the transaction event based on state information relating to transmission of the data for the application. As examples, scenarios illustrating typical situations in which incomplete action service manager 101 can be more effective in resolving incomplete data transactions will be described throughout.

In one scenario, a first user may need to transmit a large research data file (e.g., a single compressed data file) to a second user. Due to the size of the data file, the first user may initiate the data transfer to the second user at the end of the day to allow the data transfer to continue and finish overnight. However, the connection utilized by either the first user or the second user may be interrupted, causing a failure in the communication session transporting the data file. Since the data transfer is monitored (e.g., state information with respect to the transaction event is being collected), the incompleteness of the data transfer is detected based on the communication session failure. To avoid inconvenience to either the first user or the second user, state information relating to the data transfer at the time of the failure may be generated and stored (e.g., in the content database 115). As an example, such information may include references to sections or portions of the data file that have been successful transferred to the second user as well as sections or portions of the data file that have not been transferred to the second user. When the communication session is restored, the stored state information may thus be utilized to reinitiate the transfer of the data file from the first user to the second user without having to retransfer the entire data file. That is, perhaps only portions of the data file that have not been transferred to the second user need to be transmitted.

In certain embodiments, the completion of the transaction event may be based on a registration status of the user with a monitoring service. Consequently, the registration status of the user may be determined prior to initiating the completion of the transaction event. As mentioned, data transaction monitoring and completion services may be part of managed services offered and maintained by a service provider as a hosted or subscription-based service made available to users of the mobile devices 103 or computer device 113. Accordingly, the performance of completing the transaction event based on the stored state information may be restricted to subscribers of the monitoring service.

It is noted that the mobile devices 103 may be any type of mobile terminal including a mobile handset, mobile station, mobile unit, multimedia computer, multimedia tablet, communicator, netbook, Personal Digital Assistants (PDAs), smartphone, etc. It is also contemplated that the mobile devices 103 may support any type of interface for supporting the presentment or exchange of data. In addition, mobile devices 103 may facilitate various input means for receiving and generating information, including touch screen capability, keyboard and keypad data entry, voice-based input mechanisms, accelerometer (e.g., shaking the mobile device 103), and the like. Any known and future implementations of mobile devices 103 are applicable. It is noted that, in certain embodiments, the mobile devices 103 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of mobile devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 103, i.e., IP addresses that are accessible to devices connected to the service provider network 111 as facilitated via a router.

It is further noted that the computer device 113 may include some or all of the characteristics and capabilities of the mobile devices 103, as described above. In addition, the computer device 113 may be any type of computer terminal including a personal computer, workstation computer, set-top box, digital video recorder (DVR), television, automobile, appliance, etc.

In various embodiments, the completion of the transaction event may include transmission of cached data. By way of example, the data may be cached (e.g., in the content database 115) as the data is also being transmitted to the user's device from a content provider (e.g., via a service provider). Since the communication session between the content provider and the service provider is typically independent of the communication session between the service provider and the user device, the caching process may continue uninterrupted even after the failure has occurred in the communication session with the user's device. In this way, the data is still available as cached data even if a copy of the data is no longer available through the content provider. In one use case, a subscriber to a DVR recording service may program a set-top box to record a sports game that will be shown live. During the live airing of the game, a failure may occur in the communication session transporting the live data stream to the set-top box as a result of some incident on the end-user side (e.g., weather conditions, power outage, user error, etc.). Although the communication session is restored before the end of the game, the set-top box may no longer be able to obtain the sports game data from the content provider with respect to the interrupted portion. In this case, however, the digital video recording service (e.g., a monitoring service) has cached the data for the subscriber. As such, the set-top box may obtain the interrupted portion from the cached data and, thereafter, compile the previously obtained data and the data obtained from the cached data to produce the complete recording of the game for the subscriber.

In some embodiments, a cache status associated with the data may be determined (e.g., whether the data is already stored in cache). As such, caching of the data may be based on the cache status. If, for instance, it is determined that the data has not been cached, then caching of the data may then initiated. On the other hand, if the data has already been cached, then further caching of the data may not be necessary. In this way, processing, memory, and/or power resources may be conserved. In other embodiments, the cached data may be removed based on the completion of the transaction event. By way of example, after a transaction event has completed with respect to one user, the incomplete action service manager 101 may remove the cached data if it determines that other transaction events with respect to the same data are completed (e.g., other subscribers are finished recording the data).

In further embodiments, a notification message may be generated (e.g., at the user device) to alert the user associated with the transaction event. The notification message may, for instance, include information relating to the failure in the communication session. In one scenario, the user may be a subscriber to a particular monitoring service. While the user is recording a television program, a connection break occurs, resulting in a failure in the communication session that was transporting the data with respect to the television program (e.g., to the user's set-top box). Consequently, the notification message may be generated at the set-top box to inform the user as to the communication session failure as well as information relating to completing the recording. The notification message may, for instance, state that a failure occurred at a particular date and time due to a connection break and that the interrupted portion of the recording will be downloaded from the monitoring service for the user.

In some embodiments, the incomplete action service manager 101, the mobile devices 103, the computer device 113, and other elements of the system 100 may be configured to communicate via the service provider network 111. According to certain embodiments, one or more networks, such as the data network 105, the telephony network 107, and/or the wireless network 109, may interact with the service provider network 111. The networks 105-109 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 107 may include a circuit-switched network, such as the public switched telephone network (PSTN), an integrated services digital network (ISDN), a private branch exchange (PBX), or other like network. Meanwhile, the wireless network 109 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 105-109 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that the networks 105-109 may include components and facilities to provide for signaling and/or bearer communications between the various components or facilities of the system 100. In this manner, the networks 105-109 may embody or include portions of a signaling system 7 (SS7) network, Internet protocol multimedia subsystem (IMS), or other suitable infrastructure to support control and signaling functions.

Figure 2:
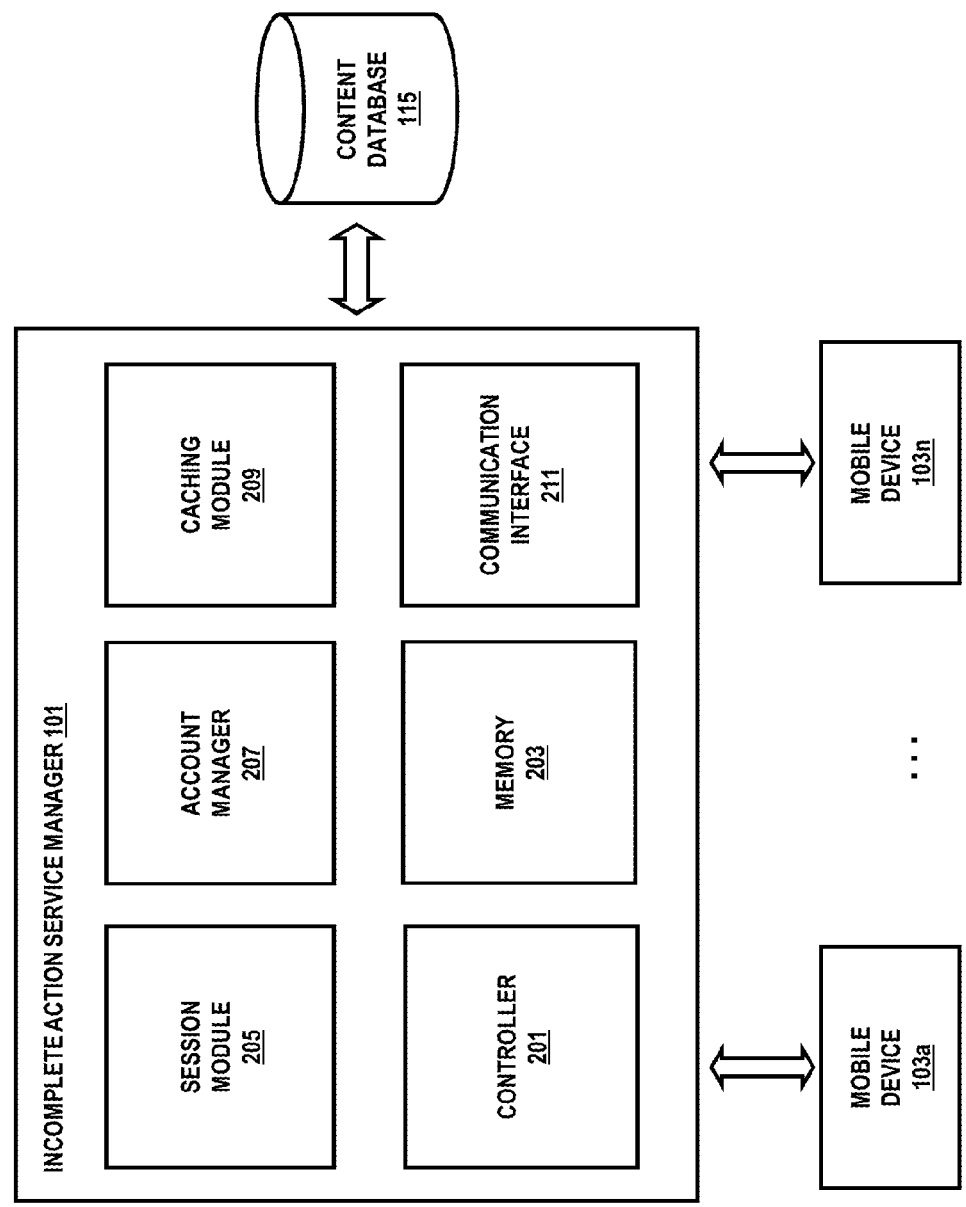
FIG. 2 is a diagram of the components of an incomplete action service manager, according to an exemplary embodiment.

FIG. 2 is a diagram of the components of an incomplete action service manager, according to an exemplary embodiment. The incomplete action service manager 101 may comprise computing hardware (such as described with respect to FIG. 8), as well as include one or more components configured to execute the processes described herein for providing incomplete action monitoring and service of the system 100. It is contemplated that the functions of these components may be combined in one or more components or performed by other components of equivalent functionality. In one implementation, the incomplete action service manager 101 includes a controller (or processor) 201, memory 203, a session module 205, a account manager 207, a caching module 209, and a communication interface 211.

The controller 201 may execute at least one algorithm for executing functions of the incomplete action service manager 101. For example, the controller 201 may interact with the session module 205 to monitor an incompleteness of a transaction event (e.g., transmission of a data file or stream) associated with an application. If, for instance, a failure in a communication session for transporting data of the application occurs, the session module 205 will detect the incompleteness of the transaction event. The session module 205 may then store state information relating to transmission of the data for the application. As provided, the state information may include information relating to a portion of the data that has not been transmitted to a device of the user associated with the transaction event.

When the session module 205 determines that the communication session has been restored, the session module 205 may work with the account manager 207 to determine a registration status of the user with a monitoring service. If, for instance, the account manager determines that the user is registered with the monitoring service (e.g., the user is a subscriber of the monitoring service), the session module 205 may then initiate completion of the transaction event based on the stored state information. In various embodiments, the transaction event may be completed using cached data associated with the transaction event. In one use case, the caching module 209 may determine a cache status associated with the data, including whether the data (or portions of the data) is currently stored as cache data, prior to the occurrence of the communication session failure. Caching of the data may then be initiated based on the cache status (e.g., caching data that is not currently stored). Thereafter, the controller 201 may operate in conjunction with the session module 205 and the caching module 209 to provide the cached data to complete the transaction event (e.g., using the cached data to compile a complete data file). On the other hand, the session module 205 may not initiate completion of the transaction if the user is not a subscriber to the monitoring service, but instead prompt the user accordingly, or offer to subscribe the user.

The controller 201 may further utilize the communication interface 211 to communicate with other components of the incomplete action service manager 101, the mobile devices 103, the computer device 113, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, or other types of communication. According to one embodiment, such methods may be used to transmit messages or alerts to inform users of information relating to the failure of the communication session. These messages or alerts can then be utilized by the respective user devices (e.g., mobile devices 103, computer device 113, etc.) to generate notification messages including such information.

Figure 3:
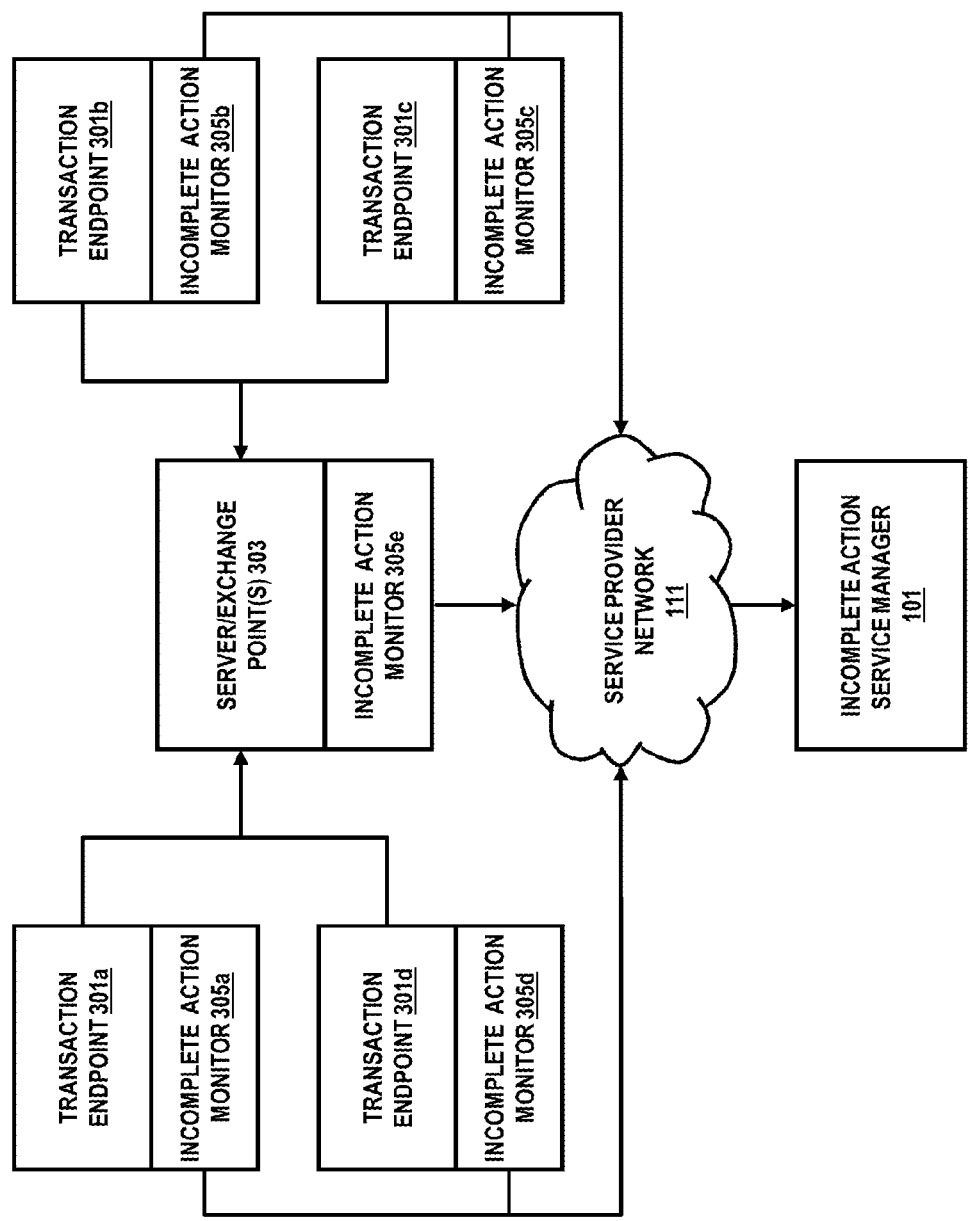
FIG. 3 is a diagram of a multi-point transaction between transaction endpoints and an incomplete action service manager, according to an exemplary embodiment.

FIG. 3 is a diagram of a multi-point transaction between transaction endpoints and an incomplete action service manager, according to an exemplary embodiment. As shown, each of the transaction endpoints 301a-301d and the server (or exchange point(s)) 303 are monitored by incomplete action monitors 305a-305e and interacts with the incomplete action service manager 101 through the service provider network 111. In one scenario, there is a break in the connection between the transaction endpoint 301a and the server 303, resulting in a failure in the communication session transporting data between them. Upon disconnect, an application at each point of disconnection (e.g., at the transaction endpoint 301a, at the server 303, etc.) collects state information relating to the transaction event (e.g., via their respective incomplete action monitors 305a and 305e) and stores the state information according to the incomplete action service manager 101. The state information may, for instance, also be relayed to the other transaction endpoints 301b-301d involved in the multi-point transaction.

Based on the settings of the server 303 or the incomplete action service manager 101, the completion of the multi-point transaction may be initiated based on the stored state information when it is determined that the communication session has been restored. For example, the other transaction endpoints 301b-301d may wait to receive an "all clear" signal (e.g., to indicate completion of a part of the multi-point transaction with respect to transaction endpoint 301a) on restoration of the communication session before continuing their respective parts of the multi-point transaction. Alternatively, the other transaction endpoints 301b-301d may broadcast error information relating to the communication session failure and roll back the multi-point transaction for diagnosis and post-mortem.

Figure 4:
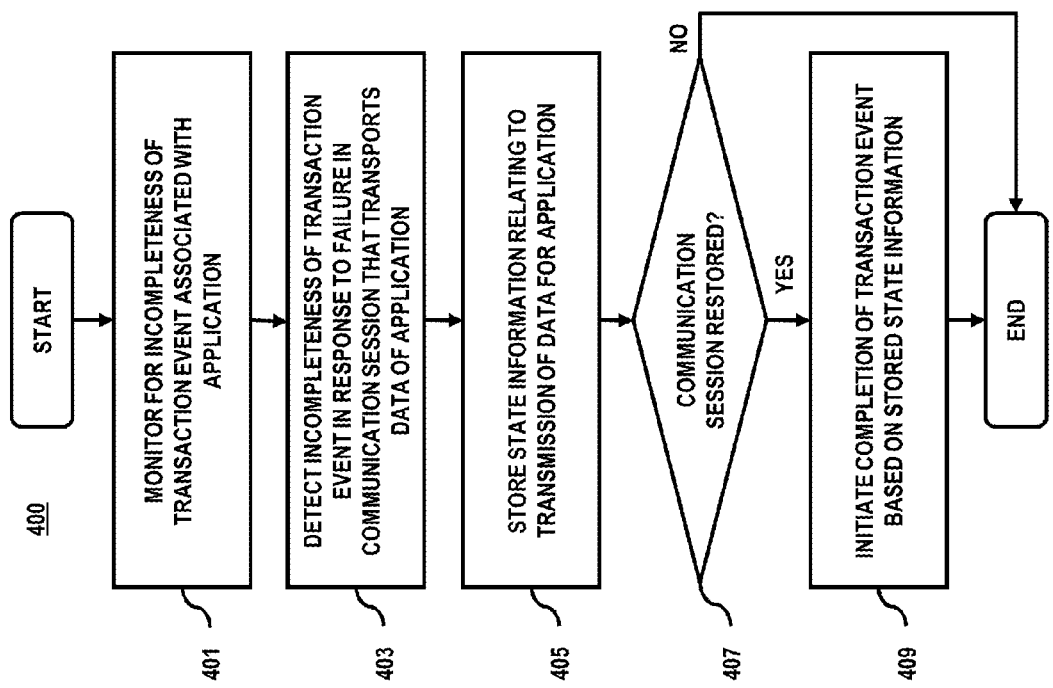
FIG. 4 is a flowchart of a process for providing incomplete action monitoring and service for data transactions, according to an exemplary embodiment.

FIG. 4 is a flowchart of a process for providing incomplete action monitoring and service for data transactions, according to an exemplary embodiment. For the purpose of illustration, process 400 is described with respect to FIG. 1. It is noted that the steps of the process 400 may be performed in any suitable order, as well as combined or separated in any suitable manner. In step 401, the incomplete action service manager 101 may monitor for an incompleteness of a transaction event associated with an application. As an example, monitoring may include testing and verifying information to stay aware of current state information relating to the transaction event. The transaction event may, for instance, be deemed incomplete where the data has not been transferred appropriately or in its entirety. As such, when a failure in a communication session transporting data of the application occurs, the incomplete action service manager 101 may, as in step 403, detect the incompleteness of the transaction event in response to the communication session failure.

In step 405, the incomplete action service manager 101 may store state information relating to transmission of the data for the application. The state information may, for instance, be saved on a periodic basis, at predetermined times, or based on the detection of the communication session failure. Such information may further relate to a portion of the data that has not been transmitted to a device of the user associated with the transaction event. In this way, the stored state information may be utilized to complete the transaction event at a later time in the future (e.g., upon restoration of the communication session). As such, in steps 407 and 409, the incomplete action service manager 101 may initiate completion of the transaction event based on the stored state information when the incomplete action service manager 101 determines that the communication session is restored.

Figure 5:
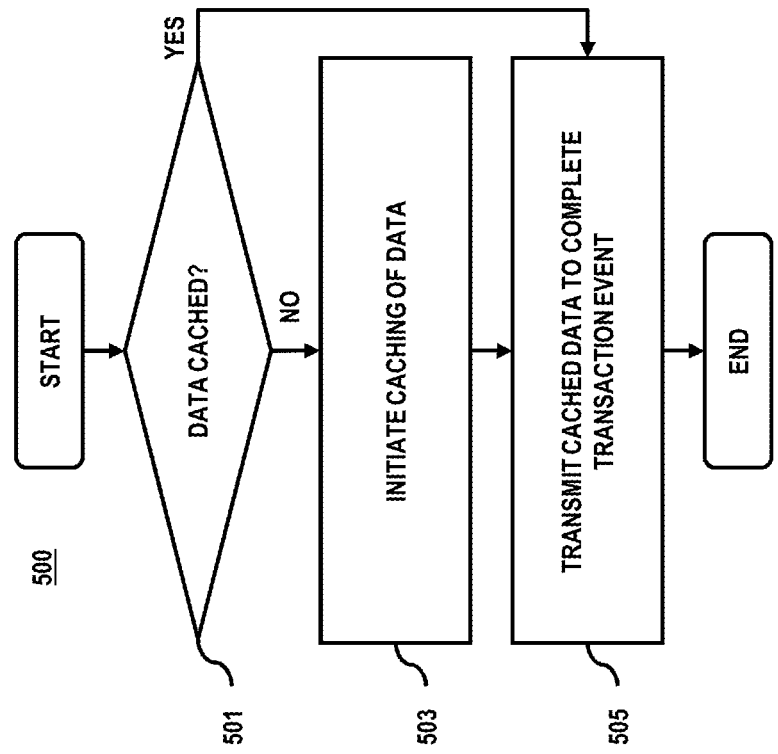
FIG. 5 is a flowchart of a process for initiating completion of a transaction event using cached data, according to an exemplary embodiment.

FIG. 5 is a flowchart of a process for initiating completion of a transaction event using cached data, according to an exemplary embodiment. For the purpose of illustration, process 500 is described with respect to FIG. 1. It is noted that the steps of the process 500 may be performed in any suitable order, as well as combined or separated in any suitable manner. In step 501, the incomplete action service manager 101 may determine whether the data is cached. If, for instance, the data is not currently cached, the incomplete action service manager 101 may, as in step 503, initiate caching of the data. The cached data may later be utilized to complete transaction events, such as the transfer of data files, data streams, etc.

As illustrated in step 505, the incomplete action service manager 101 may transmit cached data to the user, via a user device, to complete the transaction event. In one use case, the cached data is utilized to compile a complete data set for use at the user device. The incomplete action service manager 101 (or an application on the user device) may, for instance, provide instructions for compiling portions of previously downloaded data with transmitted cached data to produce a complete data set. In another scenario, the incomplete action service manager 101 may transfer the complete data set, via the cached data, to the user device. In this way, the need for additional compilation may be avoided (e.g., for small data files).

Figure 6:
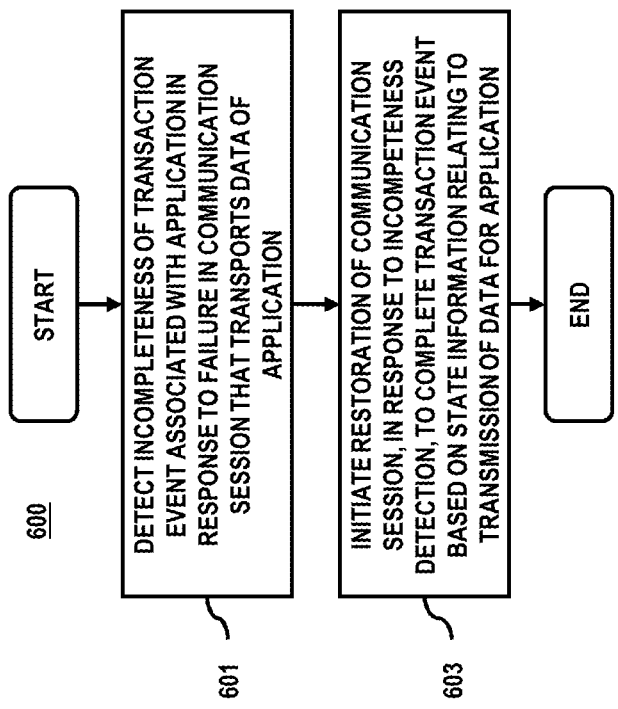
FIG. 6 is a flowchart of a process for initiating completion of a transaction event on a user device, according to an exemplary embodiment.

FIG. 6 is a flowchart of a process for initiating completion of a transaction event on a user device, according to an exemplary embodiment. For the purpose of illustration, process 600 is described with respect to FIG. 1. It is noted that the steps of the process 600 may be performed in any suitable order, as well as combined or separated in any suitable manner. In step 601, a user device (e.g., the mobile device 103, the computer device 113, etc.) may detect an incompleteness of a transaction event associated with an application in response to a failure in the communication session transporting data of the application. By way of an example, the user device may determine whether the transaction event is incomplete in response to a connection break causing the communication session failure. The incompleteness of the transaction event may be determined through the application, another application, state information provided by the incomplete action service manager 101, etc.

To complete the transaction event, the user device may, as in step 603, initiate restoration of the communication session in response to detecting the incompleteness of the transaction event. As discussed, the completion of the transaction event may be based on state information relating to transmission of the data for the application, including information relating to a portion of the data that has not been transmitted to the user device. The process of completing the transaction event may also be based on cached data, such as the transmission of cached data to the user device and compilation of cached data to produce a complete data file.

Figure 7:
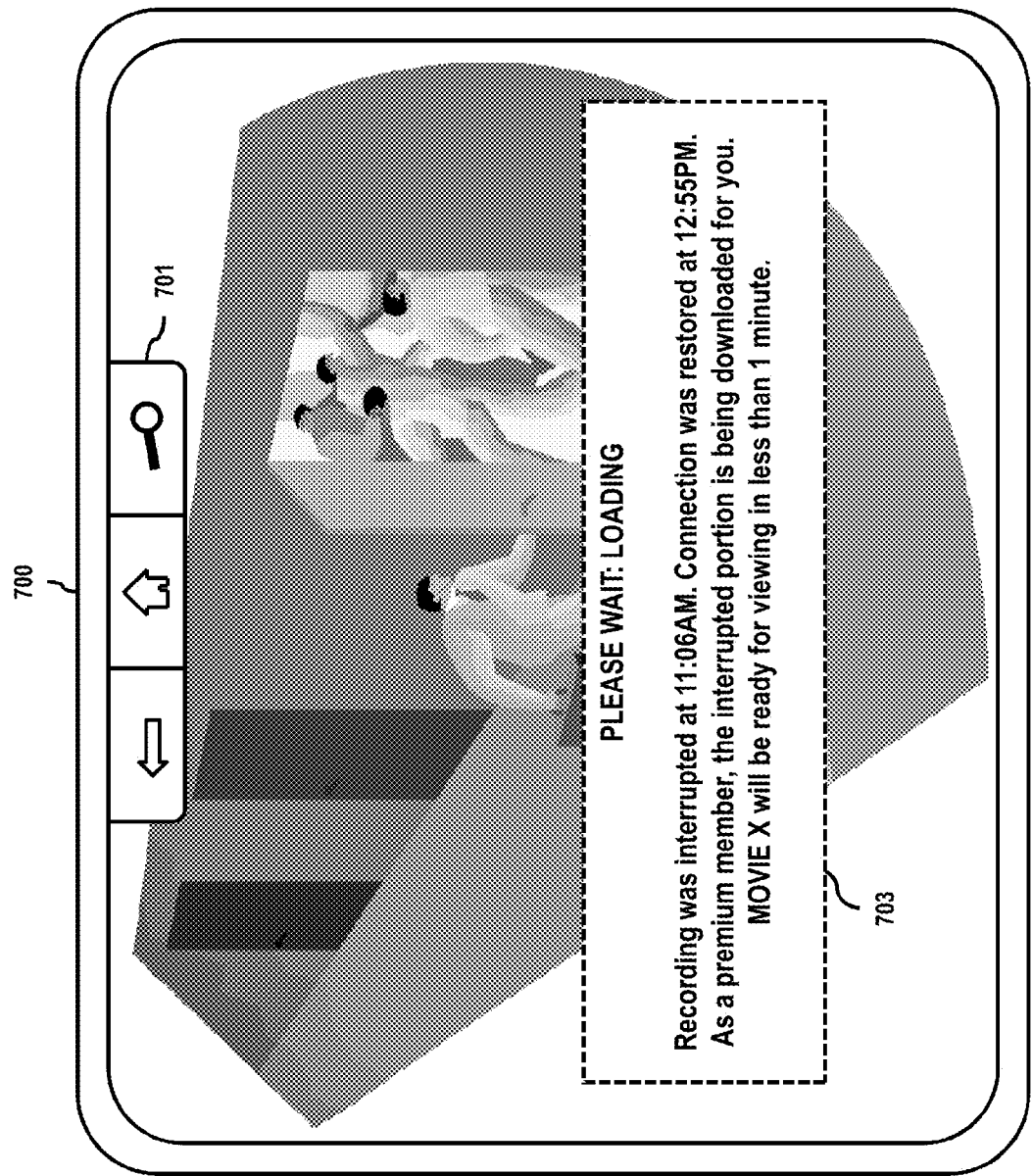
FIG. 7 is a diagram of a user interface for providing incomplete action monitoring and service for data transactions, according to an exemplary embodiment.

FIG. 7 is a diagram of a user interface for providing incomplete action monitoring and service for data transactions, according to an exemplary embodiment. For illustrative purposes, the diagram is described with reference to the system 100 of FIG. 1. For instance, FIG. 7 is a diagram of the user interface 700 featuring a toolbar 701 and notification 703. In this scenario, a subscriber to a particular monitoring service has programmed the subscriber's set-top box to record "Movie X" during its air time. As shown, the recording was interrupted at 11:06 AM due to some failure in the communication session transporting data associated with the movie to the set-top box and the communication session was not restored until 12:55 PM. Consequently, the movie recording was interrupted for nearly a two-hour period.

Nonetheless, the data associated with the movie was cached while the movie was being aired. Accordingly, the movie can still be obtained in its entirety by downloading the interrupted portion as cached data and compiling the cached data with data recorded during the movie's air time to produce a complete data set for the movie. Alternatively, the complete data set may also be obtained by downloading the complete data set associated with the movie as cached data. When the subscriber returns sometime after the air time period to watch the movie, the subscriber is notified of the communication session failure. The subscriber is thereafter informed that the interrupted portion of the movie is being downloaded to the set-top box due to the subscriber's membership status and that "MOVIE X will be ready for viewing in less than 1 minute."

In certain embodiments, the described processes and arrangement advantageously permit seamless restoration of actions (e.g., data transfer) associated with applications.

The processes described herein for providing incomplete action monitoring and service for data transactions may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
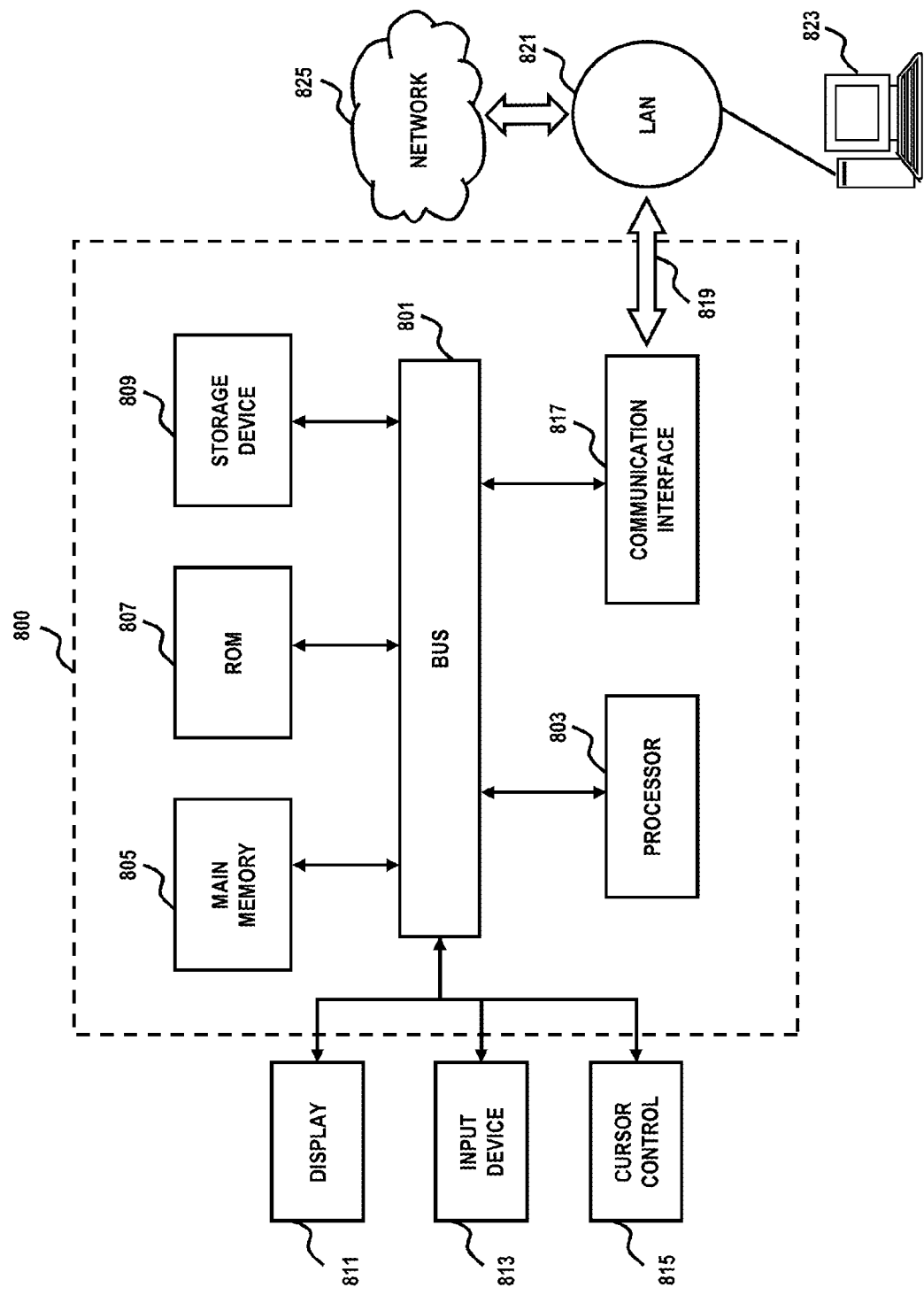
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk, flash storage, or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. Additional output mechanisms may include haptics, audio, video, etc. An input device 813, such as a keyboard including alphanumeric and other keys, is coupled to the bus 801 for communicating information and command selections to the processor 803. Another type of user input device is a cursor control 815, such as a mouse, a trackball, touch screen, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
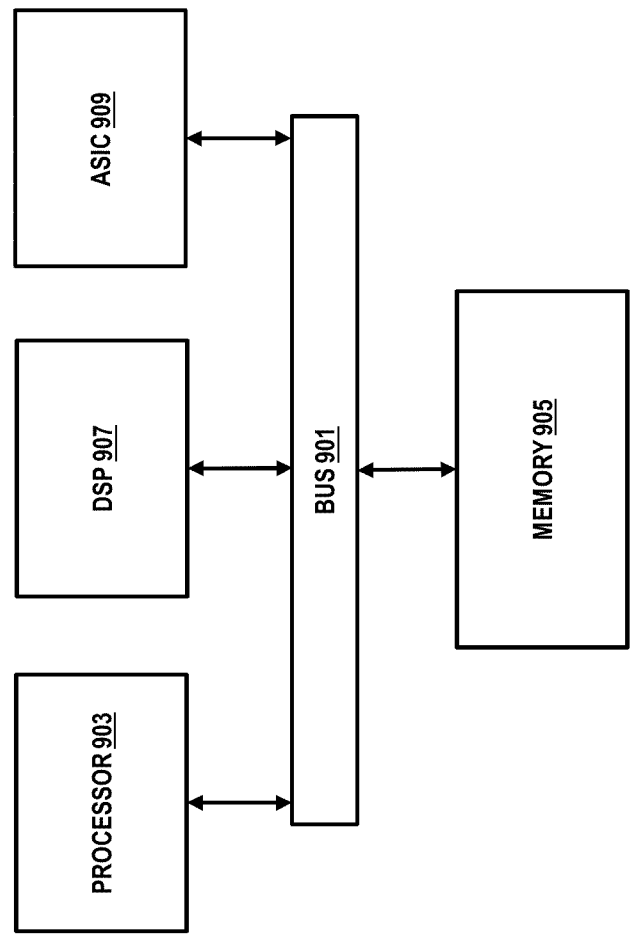
FIG. 9 is a diagram of a chip set that can be used to implement an embodiment of the invention.

FIG. 9 illustrates a chip set or chip 800 upon which an embodiment of the invention may be implemented. Chip set 900 is programmed to enable incomplete action monitoring and service for data transactions as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of enabling incomplete action monitoring and service for data transactions.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable incomplete action monitoring and service for data transactions. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

monitoring for an incompleteness of a transaction event associated with an application;

detecting the incompleteness of the transaction event in response to a failure in a communication session that transports data of the application to a user device;

storing state information relating to transmission of the data for the application;

determining that the communication session is restored; and;

initiating completion of the transaction event based on the stored state information, wherein the data is to be transmitted from a content provider to a service provider and from the service provider to the user device, and wherein a communication session between the content provider and the service provider is independent of the communication session between the service provider and the user device.

2. A method according to claim 1, further comprising:
determining a registration status of a user associated with the transaction event with a monitoring service,
wherein the completion of the transaction event is based on the registration status.

3. A method according to claim 1, wherein the state information includes information relating to a portion of the data that has not been transmitted to a device of the user.

4. A method according to claim 1, further comprising:
determining a cache status associated with the data; and
initiating caching of the data based on the cache status,
wherein the completion of the transaction event includes transmission of the cached data.

5. A method according to claim 4, wherein the caching of the data is uninterrupted by the failure in the communication session.

6. A method according to claim 4, further comprising:
removing the cached data based on the completion of the transaction event.

7. An apparatus comprising:
at least one processor; and
at least one memory including computer program code for one or more programs,
the at least one memory and the computer program code configured to, with the at least one processor, cause the apparatus to perform at least the following,
monitor for an incompleteness of a transaction event associated with an application;
detect the incompleteness of the transaction event in response to a failure in a communication session that transports data of the application to a user device;
store state information relating to transmission of the data for the application;
determine that the communication session is restored; and
initiate completion of the transaction event based on the stored state information,
wherein the data is to be transmitted from a content provider to a service provider and from the service provider to the user device, and
wherein a communication session between the content provider and the service provider is independent of the communication session between the service provider and the user device.

8. An apparatus according to claim 7, wherein the apparatus is further caused to:
determine a registration status of a user associated with the transaction event with a monitoring service,
wherein the completion of the transaction event is based on the registration status.

9. An apparatus according to claim 7, wherein the state information includes information relating to a portion of the data that has not been transmitted to a device of the user.

10. An apparatus according to claim 7, wherein the apparatus is further caused to:
determine a cache status associated with the data; and
initiate caching of the data based on the cache status,
wherein the completion of the transaction event includes transmission of the cached data.

11. An apparatus according to claim 10, wherein the caching of the data is uninterrupted by the failure in the communication session.

12. An apparatus according to claim 10, wherein the apparatus is further caused to:
remove the cached data based on the completion of the transaction event.

13. A method comprising:
detecting an incompleteness of a transaction event associated with an application in response to a failure in a communication session that transports data of the application to a user device; and
initiating restoration of the communication session, in response to detecting the incompleteness of the transaction event, to complete the transaction event,
wherein completion of the transaction event is based on state information relating to transmission of the data for the application,
wherein the data is to be transmitted from a content provider to a service provider and from the service provider to the user device, and
wherein a communication session between the content provider and the service provider is independent of the communication session between the service provider and the user device.

14. A method according to claim 13, wherein the state information includes information relating to a portion of the data that has not been transmitted to a device of a user associated with the transaction event.

15. A method according to claim 13, wherein the completion of the transaction event includes transmission of cached data.

16. A method according to claim 13, further comprising:
generating a notification message to alert a user associated with the transaction event, wherein the notification message includes information relating to the failure in the communication session.

17. An apparatus comprising:
at least one processor; and
at least one memory including computer program code for one or more programs,
the at least one memory and the computer program code configured to, with the at least one processor, cause the apparatus to perform at least the following,
detect an incompleteness of a transaction event associated with an application in response to a failure in a communication session that transports data of the application to a user device; and
initiate restoration of the communication session, in response to detecting the incompleteness of the transaction event, to complete the transaction event,
wherein completion of the transaction event is based on state information relating to transmission of the data for the application,
wherein the data is to be transmitted from a content provider to a service provider and from the service provider to the user device, and
wherein a communication session between the content provider and the service provider is independent of the communication session between the service provider and the user device.

18. An apparatus according to claim 17, wherein the state information includes information relating to a portion of the data that has not been transmitted to a device of a user associated with the transaction event.

19. An apparatus according to claim 17, wherein the completion of the transaction event includes transmission of cached data.

20. An apparatus according to claim 17, wherein the apparatus is further caused to:

generate a notification message to alert a user associated with the transaction event, wherein the notification message includes information relating to the failure in the communication session.

* * * * *